(No Model.) 3 Sheets—Sheet 1.

F. L. SENOUR & J. McHENRY.
POTATO PLANTER.

No. 393,860. Patented Dec. 4, 1888.

Witnesses.
Chas. R. Burr.
Alex J. Stewart.

Inventors.
Frank Leroy Senour.
John McHenry.
by Frank D. Johns,
their Attorney.

(No Model.) 3 Sheets—Sheet 2.

F. L. SENOUR & J. McHENRY.
POTATO PLANTER.

No. 393,860. Patented Dec. 4, 1888.

Witnesses.
Chas. R. Burr.
Alex G. Stuart.

Inventors.
Frank Leroy Senour,
John McHenry.
by Franck D. Jones,
their Attorney.

(No Model.) 3 Sheets—Sheet 3.
F. L. SENOUR & J. McHENRY.
POTATO PLANTER.
No. 393,860. Patented Dec. 4, 1888.
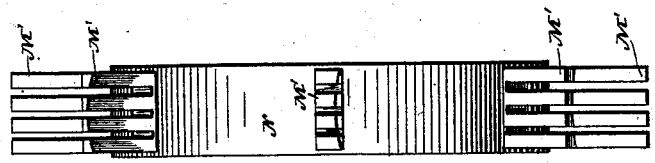
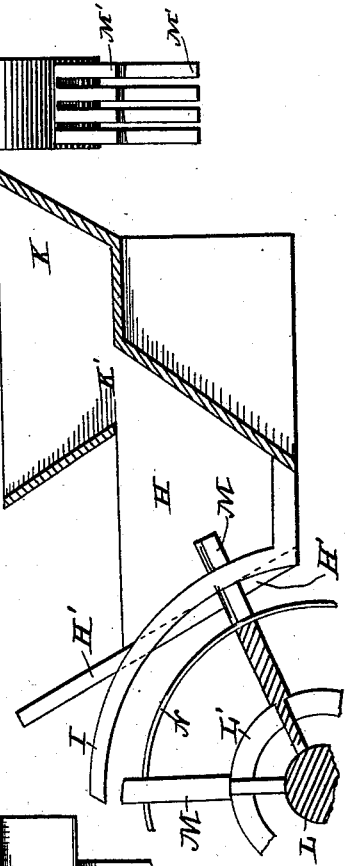
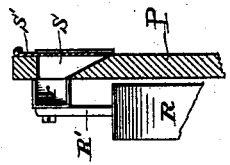
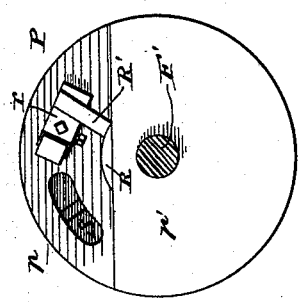
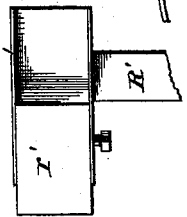
Witnesses. Inventors.

UNITED STATES PATENT OFFICE.

FAUNT LEROY SENOUR, OF NEW ALEXANDRIA, AND JOHN McHENRY, OF WILKINSBURG, PENNSYLVANIA.

POTATO-PLANTER.

SPECIFICATION forming part of Letters Patent No. 393,860, dated December 4, 1888.

Application filed July 26, 1888. Serial No. 281,111. (No model.)

*To all whom it may concern:*

Be it known that we, FAUNT LEROY SENOUR, a citizen of the United States, residing at New Alexandria, in the county of Westmoreland, State of Pennsylvania, and JOHN McHENRY, a citizen of the United States, residing at Wilkinsburg, in the county of Allegheny and State of Pennsylvania, have invented certain new and useful Improvements in Potato-Planters; and we do hereby declare the following to be a full, clear, and exact description of the invention, such as will enable others skilled in the art to which it appertains to make and use the same.

Our invention relates to improvements in potato-planters, and is more particularly an improvement upon Patent No. 330,158; and it consists in certain novelty in the construction, arrangement, and combination of the various parts, all of which we will now proceed to point out and describe, reference being had to the accompanying drawings, in which—

Figure 1:
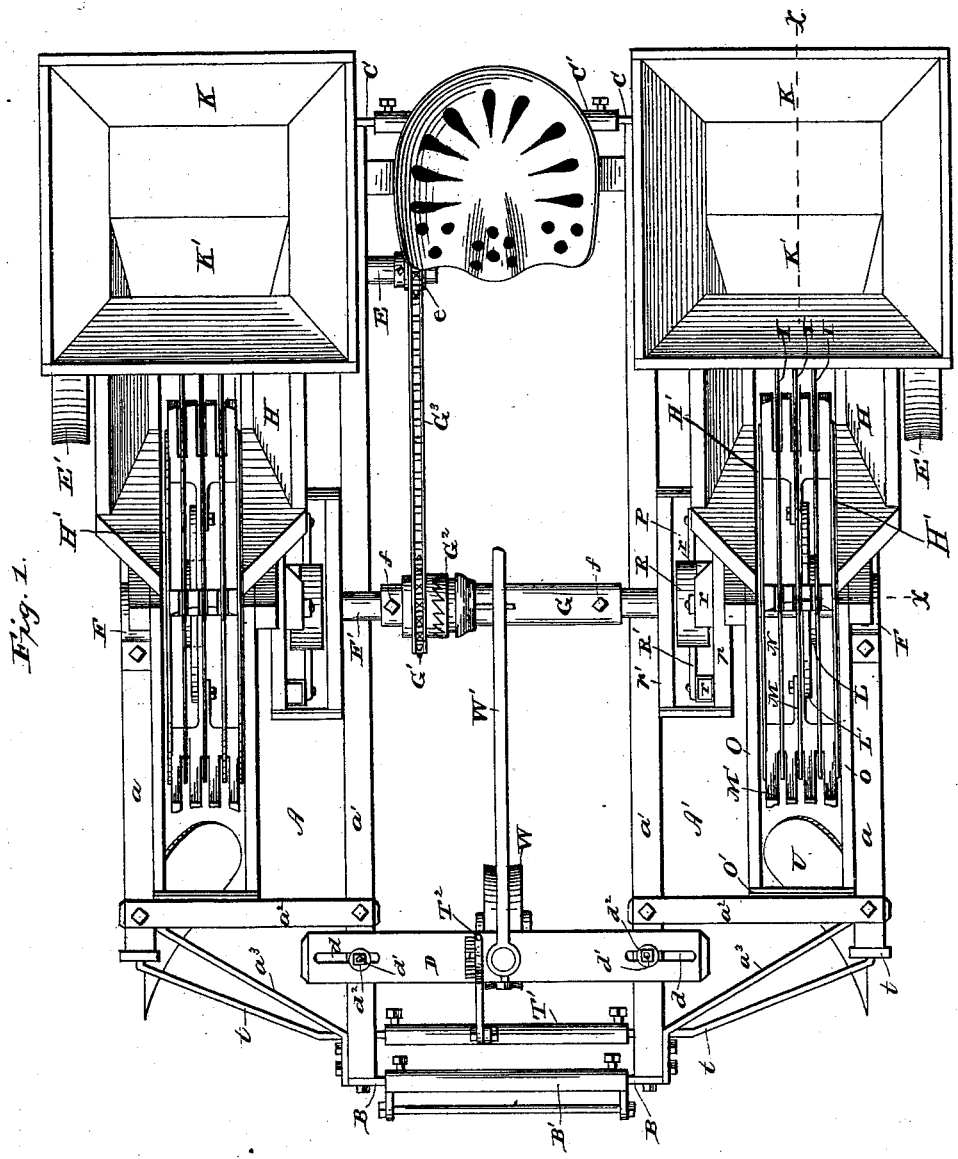
Figure 2:
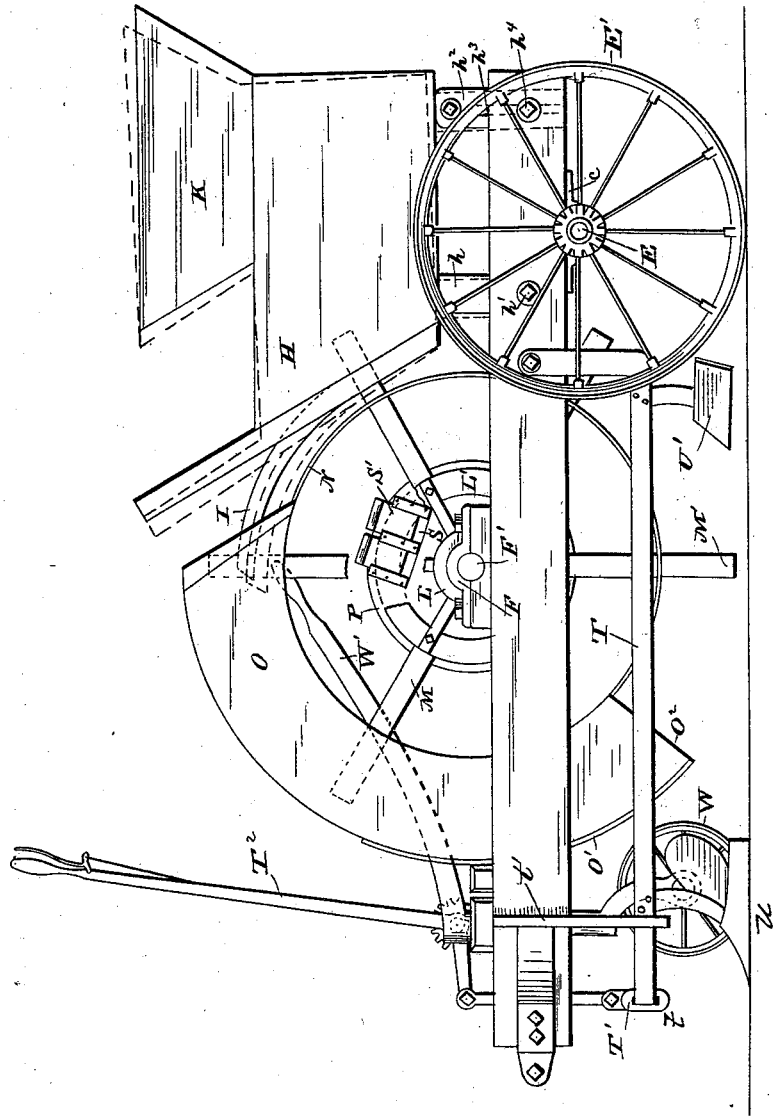

Figure 1 is a top plan view of a planter embodying our invention. Fig. 2 is a side elevation of the same; Fig. 3, a detail showing the fertilizer-distributing device attached to our planter, and Figs. 4, 5, and 6 are details of various parts of our invention. Fig. 7 is a longitudinal section, taken on line $x\,x$ of Fig. 1, the lower and forward portion of the machine being broken away.

Referring to said drawings, the frame of the machine is composed of two parts, A A'. Each of said parts consists of outer side bars, $a$, and inner and parallel bars, $a'$, said bars being connected by cross-bars $a^2$ and forward end braces, $a^3$. The inner bars, $a'$, project slightly beyond the side bars at the forward end of the frame.

B are inwardly-projecting arms secured to the forward ends of the parts A A', and having their inner ends mounted in and connected by a sleeve, B'. C are similarly-formed arms secured to the rear ends of the parts A A', and having their inner ends mounted in and connected by a sleeve, C'.

D D are cross-bars having slots $d$ in their ends, and are secured to and connect the parts A A' by means of suitable bolts, $d'$, which pass through bolt-holes in the bars $a'$ and the slots $d$, and are provided with clamping-nuts $d^2$. One of the bars D is secured to the upper and the other to the lower side of the bars $a'$. By means of this construction the two parts composing the frame can be adjusted to or from each other, so as to increase or lessen the width of the frame of the machine, for a purpose hereinafter set forth.

To the under side of the rear of the parts A A' are secured bearings $c\,c$, in which are mounted short shafts E E. On the outer ends of said shafts are mounted the supporting and driving wheels E' E'. One of said shafts E projects in beyond its bearing and has rigidly mounted thereon a sprocket-wheel, $e$. Said wheels E' are preferably located at the rear of the frame, as shown in the drawings.

F F are bearings located about the center of the frame in which are mounted shafts F' F', the inner ends of said shafts being connected by a sleeve, G, which is provided with set-screws $f\,f$, by means of which the shafts can be rigidly secured to the sleeve. When the parts of the frame are adjusted to or from each other, the ends of the shafts move in or out in the sleeve and are secured at the desired adjustment by means of the set-screws.

G' is a sprocket-wheel mounted loosely on the sleeve. Said wheel G' is provided with a clutch, which is adapted to be engaged by a clutch, $G^2$, keyed to the sleeve, so as to throw the wheel in gear when said clutches are in engagement. The operating-lever of the clutch is not shown in the drawings, as it forms no part of our invention, and any desired lever may be used.

$G^3$ is a sprocket-chain connecting the wheels $e$ and G'.

On each of the parts A A' of the frame are arranged the potato-planting and fertilizer-distributing devices. We will describe but one, as the devices on each part are similarly constructed.

H represents the potato-distributing hopper having its forward end supported on two downwardly-projecting legs, $h\,h$, which are pivotally secured to the bars $a\,a'$ by suitable bolts or pins, $h'$, the rear of said hopper H being supported on two downwardly-projecting legs, $h^2\,h^2$, having slots $h^3$ in their lower ends. Said rear legs are secured to the bars $a\ a'$ by bolts $h^4$ passing through the slots $h^3$, and provided with suitable clamping-nuts, by means of which the rear end of the hopper may be raised or lowered, for a purpose hereinafter set forth. Said hopper has inclined sides and ends and an open bottom.

H' is a slot or aperture in the forward end of the hopper extending from top to bottom and communicating with the open bottom of the hopper.

I are parallel bars extending longitudinally across the bottom of the hopper and having upwardly-curved extensions which are located in the aperture H' and project through the same near the top of the hopper. Said bars are arranged sufficiently near each other to prevent the seed-potatoes from falling between the same. Three bars are preferably used, as shown in the drawings. Located above the distributing-hopper is a supply-hopper, K, having an aperture, K', in its bottom, through which the potatoes escape to the hopper H. The potatoes are fed gradually through aperture in the hopper K to the hopper H and are thus prevented from becoming jammed in said distributing-hopper H.

L is a hub mounted on the shaft F' and rigidly secured thereto by a set-screw. Said hub is located directly in front of the aperture H' and provided with spokes, to the outer ends of which are secured a ring, L'.

M are radial arms secured to ring L and having on their outer ends parallel lifting-fingers M', preferably four in number, which pass between the bars I and their extensions and project within the hopper as the arms rotate with the shaft. Extending around from arm to arm at the inner ends of the fingers is a circular bed, N, concentric with the ring L', and formed of a series of wires or of a solid plate, as shown in Fig. 6.

O are two segmental guide-plates secured to the frame and extending up on each side of the lifting-fingers nearly to the hopper. These plates prevent the potatoes from falling off the fingers when they leave the hopper. The outer edges of said plates from the frame down are connected by a plate, O', thus forming a chute, $O^2$, which has its discharge-opening at a point back of the furrow-opening hereinafter described. When the lifting-fingers leave the hopper and pass the bars I, the potatoes fall on the bed N, and as the same revolves are dropped into the chute and from thence into the furrow. The hopper H, being adjustable on its supporting-legs, may be raised or lowered so as to cause the lifting-fingers to project to any desired length between the bars I into said hopper, and thus take up the desired number of seed-potatoes. The farther said fingers extend into the hopper the greater number of potatoes will they lift and deposit in the chute as they revolve. It will thus be seen that the number of potatoes or pieces of potatoes to be planted can be accurately regulated by simply raising or lowering the rear end of the distributing-hopper.

Any desired number of arms and fingers may be secured to the ring on the shaft, so as to regulate the distance apart the potatoes are planted; or said arms may if desired be secured directly to the hub or to the shaft itself. Said arms carrying the lifting-fingers could, if desired, be secured to the periphery of the seed and fertilizer wheel shown in Patent No. 330,158, and if desired the main shaft carrying the supporting and driving wheels could be so arranged that the potato-feeding arms and fingers could be secured directly to said main shaft.

P is a fertilizer-distributing hopper, secured in any suitable manner to the frame in front of the potato-hopper. Said hopper has a curved bottom, and its side approximate to the potato-planting fingers is formed of a circular plate, $p$. Its other side is formed of a segmental plate, $p'$; or, if desired, said plate $p'$ may be a full circle. In the center of said plates is an aperture through which the shaft F' passes. Mounted on said shaft within the hopper is a hub, R, to which are secured any desired number of arms, R', corresponding to the number of arms carrying the potato-lifting fingers. On the end of each arm is a cup, $r$, having its side next to the plate $p$ and one end open, the other end being closed by an adjustable block, $r'$.

S is a slot in the side plate, $p$, having a downwardly and outwardly beveled lower edge. As the shaft revolves, each cup in turn fills at the bottom of the hopper with the fertilizing material and carries it up until it reaches the slot S, through which it falls to the ground by the side of the potatoes. By means of the adjustable blocks the capacity of the cups may be increased or diminished so as to carry more or less fertilizer; or, if desired, the adjustable blocks may be dispensed with and the end permanently closed. The slot S being provided with a series of gates or slides, S', the quantity of fertilizer deposited by each cup may be regulated by removing one or more of the gates or slides, so as to increase or lessen the size of said slot S.

T are rods or bars having their rear ends pivotally secured to the outer sides of the frame, and their forward ends, $t$, bent in and connected by a sleeve, T'.

$t'$ are slotted guides in which said arms work.

U are furrow-openers secured to the arms in front of the potato-planting chute.

U' are coverers secured to the arms back of said chute.

$T^2$ is a lever pivotally secured to the front of the frame and connected to the sleeve T'. Said lever is provided with a spring-actuated dog and toothed sector, whereby it can be held as adjusted. By operating said lever the furrow openers and closers can be raised or lowered, so as to throw the same in or out of operation.

W is a guiding caster-wheel having the pintle of its yoke mounted in a suitable bearing. W' is a lever connected with the same, by means of which the wheel may be turned to the right or left to guide the machine.

By adjusting the two parts of the frame to or from each other the distance apart of the potato-rows can be regulated.

Having thus fully described our invention, we claim as new and desire to secure by Letters Patent—

1. In a potato-planter, the combination, with a hopper pivotally secured to the main frame and having an open bottom and a slotted end and parallel bars or arms extending longitudinally across said bottom and slotted end, and mechanism, substantially as described, for raising or lowering the rear end of the hopper, of a rotating shaft carrying a series of arms provided with potato-lifting fingers adapted to pass between the bars in the bottom and end of the hopper as the shaft revolves, all constructed, arranged, and operating substantially as shown and described, whereby the hopper may be adjusted so as to cause the lifting-fingers to project more or less through the bars into said hopper.

2. In a potato-planter, the combination, with the hopper H, pivotally secured to the frame and having an open bottom and a slot, H', in its forward end and the parallel bars I, extending longitudinally across the bottom of the hopper and having upwardly-curved extensions located in the slot H', and mechanism, as described, for raising or lowering the rear end of said hopper, of a rotating shaft carrying a series of arms, M, provided on their outer ends with parallel potato-lifting fingers M', adapted to pass between the bars I and project within the hopper as the shaft revolves, all constructed, arranged, and operating substantially as shown and described, whereby by adjusting the hopper the fingers may be caused to project more or less into said hopper, for the purpose set forth.

3. In a potato-planter, the combination, with the hopper H, having its forward end supported on the legs $h$, pivotally secured to the frame, and its rear end supported on legs $h^2$, having slots $h^3$, and bolts $h^4$, adjustably securing said legs to the frame, said hopper having an open bottom and slot, H', in its forward end and parallel bars I, extending longitudinally across the bottom of the hopper and having upwardly-curved extensions located in the slot H', of a rotating shaft having secured thereto a series of radial arms, M, provided with parallel potato-lifting fingers M' on their outer ends, adapted to pass between the bars I and extend within said hopper when the shaft revolves, all constructed, arranged, and operating substantially as shown and described, for the purpose set forth.

4. In a potato-planter, the combination, with the hopper H, pivotally secured to the frame and having an open bottom and a slot, H', in its forward end and the parallel bars I extending longitudinally across the bottom and provided with upwardly-curved extensions located in the slot H', and mechanism, as described, for raising and lowering the rear end of the hopper, of a rotating shaft carrying a series of arms, M, the circular bed N, secured to said arms, the parallel potato-lifting fingers M', projecting from said bed N and adapted to pass between the bars I and enter the hopper, the segmental guide-plates O, extending up on each side of the bed N, and lifting-fingers M', and the chute $O^2$, all constructed, arranged, and operating substantially as shown and described, as and for the purpose set forth.

5. The combination, with the fertilizer-distributing hopper P, having a curved bottom and circular side plate, $p'$, provided with the slot S, of a rotating shaft passing transversely through the center of said hopper, the arms R', secured to said shaft and located within said hopper and having on their outer ends cups $r$, having one end and the side next to the plate $p$ open, and provided with adjustable blocks $r'$, all constructed, arranged, and operating substantially as shown and described.

6. The combination, with the fertilizer-distributing hopper P, having a curved bottom and circular side plate, $p$, and the slot S in said side plate, provided with the gates or slides S', of a rotating shaft passing transversely through the center of said hopper, the arms R', secured to said shaft and located within the hopper and having on their outer ends cups $r$, having one end and the side next to the plate $p$ open, all constructed, arranged, and operating substantially as shown and described.

7. In a potato-planter, the combination, with the frame formed in two parts, A A', adjustable laterally to or from each other, of the rods or bars T, having their rear ends pivotally secured to the outer sides of said parts A A' and their forward ends, $t$, connected by the sleeve T', the furrow-openers U and coverers U', secured to said rods or bars T, and the adjusting-lever $T^2$, connected with the sleeve T', all constructed, arranged, and operating substantially as shown and described.

In testimony whereof we affix our signatures in presence of two witnesses.

F. LEROY SENOUR.
    JOHN McHENRY.

Witnesses:
 JAMES L. BLACK,
 CHAS. W. SCOVEL.